United States Patent
Li et al.

(10) Patent No.: US 10,447,360 B2
(45) Date of Patent: Oct. 15, 2019

(54) MASSIVE DIGITAL-ANALOG HYBRID ANTENNA, CHANNEL STATE INFORMATION FEEDBACK METHOD AND CHANNEL STATE INFORMATION FEEDBACK DEVICE

(71) Applicant: CHINA ACADEMY OF TELECOMMUNICATIONS TECHNOLOGY, Beijing (CN)

(72) Inventors: Chuanjun Li, Beijing (CN); Xin Su, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/557,948

(22) PCT Filed: Mar. 1, 2016

(86) PCT No.: PCT/CN2016/075222
§ 371 (c)(1),
(2) Date: Sep. 13, 2017

(87) PCT Pub. No.: WO2016/145986
PCT Pub. Date: Sep. 22, 2016

(65) Prior Publication Data
US 2018/0062715 A1    Mar. 1, 2018

(30) Foreign Application Priority Data
Mar. 19, 2015    (CN) .......................... 2015 1 0121860

(51) Int. Cl.
*H04B 7/04*    (2017.01)
*H04B 7/0417*    (2017.01)
(Continued)

(52) U.S. Cl.
CPC ............. *H04B 7/0469* (2013.01); *H01Q 3/00* (2013.01); *H01Q 3/38* (2013.01); *H04B 7/04* (2013.01);
(Continued)

(58) Field of Classification Search
CPC .. H04B 7/0617; H04B 7/0456; H04B 7/0842; H04B 7/10
See application file for complete search history.

(56) References Cited

U.S. PATENT DOCUMENTS 6,091,365 A * 7/2000 Derneryd ............... H01Q 1/246
343/700 MS
2006/0038599 A1* 2/2006 Avants ................. H03H 11/265
327/276
(Continued)

FOREIGN PATENT DOCUMENTS

CN    101931513 A    12/2010
CN    102270977 A    12/2011
(Continued)

OTHER PUBLICATIONS

International Search Report for PCT/CN2016/075222, dated Apr. 29, 2016, and its English translation provided by WIPO.
(Continued)

*Primary Examiner* — David S Huang
(74) *Attorney, Agent, or Firm* — Ladas & Parry, LLP

(57) ABSTRACT

The present disclosure provides a massive digital-analog hybrid antenna, a CSI feedback method and a CSI feedback device. The CSI feedback method includes: at an analog precoding matrix selection stage of an analog precoding period, transmitting, by a base station, a precoded downlink reference signal and receiving first-stage CSI and measurement information fed back by a UE on a subframe corresponding to each time offset; selecting, by the base station,
(Continued)

a target analog precoding matrix in accordance with performance measurement values of analog precoding matrices corresponding to all P time offsets; and at a target analog precoding matrix using stage of the analog precoding period, transmitting, by the base station, the downlink reference signal precoded by the target analog precoding matrix and receive second-stage CSI fed back by the UE on each predetermined subframe.

18 Claims, 6 Drawing Sheets

(51) Int. Cl.
| | |
|---|---|
| H04L 5/00 | (2006.01) |
| H01Q 3/38 | (2006.01) |
| H04B 7/0456 | (2017.01) |
| H04L 1/06 | (2006.01) |
| H01Q 3/00 | (2006.01) |
| H04B 7/0413 | (2017.01) |
| H04B 7/06 | (2006.01) |

(52) U.S. Cl.
CPC ......... *H04B 7/0413* (2013.01); *H04B 7/0417* (2013.01); *H04B 7/0632* (2013.01); *H04B 7/0695* (2013.01); *H04L 1/06* (2013.01); *H04L 5/0023* (2013.01); *H04L 5/0057* (2013.01)

(56) References Cited

U.S. PATENT DOCUMENTS

| | | | |
|---|---|---|---|
| 2012/0033761 A1 | 2/2012 | Guo | |
| 2013/0057432 A1 | 3/2013 | Rajagopal et al. | |
| 2013/0202054 A1 | 8/2013 | Khan et al. | |
| 2013/0301454 A1 | 11/2013 | Seol et al. | |
| 2015/0163004 A1* | 6/2015 | Harel | H04J 3/1694 370/278 |
| 2017/0272139 A1* | 9/2017 | Benjebbour | H04L 5/00 |

FOREIGN PATENT DOCUMENTS

| | | |
|---|---|---|
| CN | 102291214 A | 12/2011 |
| CN | 102365789 A | 2/2012 |
| WO | 2014/190903 A1 | 12/2014 |
| WO | 2014193475 A1 | 12/2014 |

OTHER PUBLICATIONS

Written Opinion of the International Search Authority for PCT/CN2016/075222, dated Apr. 29, 2016, and its English translation provided by Bing Translator.

International Preliminary Report on Patentability (IPRP; Ch. 1) for PCT/CN2016/075222, dated Sep. 28, 2017, and its English translation provided by WIPO.

Written Opinion of the International Search Authority for PCT/CN2016/075222, dated Apr. 29, 2016, and its English translation provided by WIPO.

From EPO Application No. 16764167.9, Supplementary Partial European Search Report with Provisional Opinion accompanying the partial search result dated Mar. 27, 2018.

From EPO Application No. 16764167.9, Supplementary European Search Report and Search Opinion dated Aug. 1, 2018.

* cited by examiner

MASSIVE DIGITAL-ANALOG HYBRID ANTENNA, CHANNEL STATE INFORMATION FEEDBACK METHOD AND CHANNEL STATE INFORMATION FEEDBACK DEVICE

CROSS-REFERENCE TO RELATED APPLICATIONS

The present application is the U.S. national phase of PCT Application No. PCT/CN2016/075222 filed on Mar. 1, 2016, which claims priority to the Chinese patent application No.201510121860.5 filed on Mar. 19, 2015, the disclosures of which are incorporated herein by reference in their entireties.

TECHNICAL FIELD

The present disclosure relates to the field of communication technology, in particular to a massive digital-analog hybrid antenna, a Channel State Information (CSI) feedback method, and a CSI feedback device.

BACKGROUND

A Multiple Input Multiple Output (MIMO) technology plays a very important role in improving a peak rate and a system spectrum utilization rate, so such a wireless access technology standard as Long Term Evolution (LTE) or LTE-Advanced (LTE-A) is established on the basis of a Multiple Input Multiple Output and Orthogonal Frequency Division Multiplexing (MIMO+OFDM).

In addition, for the MIMO technology, its performance gain is derived from a spatial freedom degree capable of being acquired by a multi-antenna system, so the most important development direction of the standardization of the MIMO technology lies in the extension of dimensions. An LTE Rel-8 system may at most support the MIMO transmission through four layers. An LTE Rel-9 system focuses on the enhancement of a Multi-USER MIMO (MU-MIMO) technology, and the MU-MIMO technology with a Transmission Mode (TM)-8 may at most support four downlink data layers. In an LTE Rel-10 system, eight antenna ports are introduced, so as to improve a spatial resolution of CSI and extend a transmission capability of Single-User MIMO (SU-MIMO) to at most eight data layers.

In order to further improve the MIMO technology, a massive antenna technique has been introduced into a mobile communication system. In the related art, a massive, full-digital antenna includes up to 128, 256 or 512 antenna elements, and each antenna element is connected to a transceiver, i.e., the massive antenna may include up to 128, 256 or 512 transceivers and 128, 256 or 512 antenna ports. Due to the large quantity of transceivers, a volume of data to be transmitted may increase. For example, for 128 antenna ports, its transmission rate R is about 157286.4 Mbps, and 32 fifth-generation (5G) optical fibers needs to be provided for the data transmission. In addition, the spatial resolution of the CSI directly depends on the number of ports for a downlink reference signal, and in order to acquire channel information about each antenna port, a large number of CSI-Reference Signals (CSI-RSs) need to be provided, resulting in a large overhead of time/frequency resources.

Hence, for the massive, full-digital antenna which includes a large number of transceivers and where a large number CSI-RSs need to be provided, there is an urgent need to meet the requirement on a high transmission rate and reduce the overhead of the time/frequency resources.

SUMMARY

An object of the present disclosure is to provide a massive digital-analog hybrid antenna, a CSI feedback method and a CSI feedback device, so as to meet the requirements on a high transmission rate in the case of a large number of transceivers and reduce the overhead on time/frequency resources due to a large number CSI-RSs.

In one aspect, the present disclosure provides in some embodiments a massive digital-analog hybrid antenna, including $N_H \times N_V$ analog antenna ports corresponding to $N_H \times N_V$ phase shifters and $N_H \times M_V$ digital antenna ports corresponding to $N_H \times M_V$ transceivers. First ends of the $N_H \times N_V$ phase shifters are each connected to a corresponding one of $N_H \times N_V$ antenna units forming a planar array, second ends of the $N_H \times N_V$ phase shifters are divided into $N_H \times M_V$ groups each connected to a corresponding one of $N_H \times M_V$ combiner/divider units, each group of phase shifters correspond to $K_V$ channels, and $N_V = M_V K_V$. One end of each of the $N_H \times M_V$ transceivers is connected to a corresponding one of the $N_H \times M_V$ combiner/divider units.

In a possible embodiment of the present disclosure, the $N_H \times N_V$ antenna units include $N_H \times N_V$ single-polarization antenna elements or $N_H/2 \times N_V$ double-polarization antenna elements.

According to the massive digital-analog hybrid antenna, it is able to remarkably reduce the number of the digital antenna ports to $1/K_V$ of the number of the antenna ports of a massive, full-digital antenna.

In another aspect, the present disclosure provides in some embodiments a CSI feedback method for the above-mentioned massive digital-analog hybrid antenna, including steps of: at an analog precoding matrix selection stage of an analog precoding period, precoding, by a base station at each predetermined time offset, a downlink reference signal using an analog precoding matrix corresponding to each time offset and a predetermined digital precoding matrix, and transmitting the precoded downlink reference signal and receiving first-stage CSI and measurement information fed back by a User Equipment (UE) on a subframe corresponding to each time offset, the first-stage CSI being CSI calculated by the UE in accordance with a measurement result after the UE has measured a spatial channel in accordance with the received, precoded downlink reference signal, the measurement information being an average value of Reference Signal Received Power (RSRP) values corresponding to the time offsets or an average value of Channel Quality Indicator (CQI) values corresponding to the time offsets; generating, by the base station, a performance measurement value of the analog precoding matrix in accordance with the measurement information fed back by the UE with respect to each time offset, and selecting a target analog precoding matrix from the analog precoding matrices; and at a target analog precoding matrix using stage of the analog precoding period, transmitting, by the base station, the downlink reference signal precoded by the target analog precoding matrix on each predetermined subframe, and receiving second-stage CSI fed back by the UE on each predetermined sub-frame, the second-stage CSI being CSI calculated by the UE in accordance with a measurement result after the UE has measured the spatial channel in accordance with the downlink reference signal precoded by the target analog precoding matrix.

According to the CSI feedback method in the embodiments of the present disclosure, it is able to remarkably reduce the number of digital antenna ports, and provide a sufficient narrow beam to achieve three-dimensional (3D) scanning, thereby to reduce the interference between the UEs and improve the throughput. As compared with the massive, full-digital antenna, it is able to reduce the calculation difficulty in the data transmission and the signal processing, improve the performance gain due to 3D beamforming and match an actual transmission capability of a channel, thereby to enable the base station to perform link adaptation in a more accurate manner.

In a possible embodiment of the present disclosure, the CSI feedback method further includes, at a preconfiguration stage, configuring, by the base station, the analog precoding period, P time offsets and an analog precoding matrix group, the analog precoding matrix group including P predetermined analog precoding matrices, the P predetermined analog precoding matrices including P predetermined $1 \times N_V$ matrices, each time offset corresponding to one of the analog precoding matrices, and P being a positive integer.

In a possible embodiment of the present disclosure, the step of, at the analog precoding matrix selection stage of the analog precoding period, precoding, by the base station at each predetermined time offset, the downlink reference signal using the analog precoding matrix corresponding to each time offset and the predetermined digital precoding matrix includes: at the analog precoding matrix selection stage of the analog precoding period, configuring, by the base station at each time offset, a corresponding analog precoding matrix for $N_V$ analog antenna ports in each column among $N_H \times N_V$ analog antenna ports through a control signal from a phase shifter of a base band; and configuring, by the base station, a predetermined digital precoding matrix for $M_V$ digital antenna ports in each column among $N_H \times M_V$ digital antenna ports corresponding to the $N_V$ analog antenna ports in each column. The predetermined digital precoding matrix is a predetermined $1 \times M_V$ matrix.

In a possible embodiment of the present disclosure, the step of generating, by the base station, the performance measurement value of the analog precoding matrix corresponding to each time offset in accordance with the measurement information fed back by the UE with respect to each time offset, and selecting the target analog precoding matrix from the analog precoding matrices includes: generating, by the base station, the performance measurement value corresponding to each analog precoding matrix in accordance with the measurement information fed back by the UE with respect to each time offset; and selecting, by the base station, the target analog precoding matrix in accordance with the performance measurement values of all the analog precoding matrices, the target analog precoding matrix having a maximum performance measurement value with respect to a predetermined parameter.

In a possible embodiment of the present disclosure, the CSI feedback method further includes, at the analog precoding matrix selection stage of the analog precoding period, prior to the step of precoding, by the base station, the downlink reference signal, configuring, by the base station, CSI-RS resources for $N_H \times 1$ digital antenna ports, the $N_H \times 1$ digital antenna ports being mapped on the basis of the predetermined analog precoding matrix and the predetermined digital precoding matrix, and the CSI-RS resources being used to transmit the precoded downlink reference signal.

In a possible embodiment of the present disclosure, the CSI feedback method further includes: at the target analog precoding matrix using stage of the analog precoding period, prior to the step of precoding, by the base station, the downlink reference signal, configuring, by the base station, CSI-RS resources for $N_H \times M_V$ digital antenna ports, the $N_H \times M_V$ digital antenna ports being mapped on the basis of the target analog precoding matrix, and the CSI-RS resources being used to transmit the downlink reference signal precoded by the target analog precoding matrix; or at the target analog precoding matrix using stage of the analog precoding period, prior to the step of precoding, by the base station, the downlink reference signal, configuring, by the base station, a first CSI-RS resource for $M_V$ digital antenna ports in any column among the $N_H \times M_V$ digital antenna ports, and configuring, by the base station, a second CSI-RS resource for $N_H$ digital antenna ports in any row among the $N_H \times M_V$ digital antenna ports, the $N_H \times M_V$ digital antenna ports being mapped on the basis of the target analog precoding matrix, and the CSI-RS resources being used to transmit the downlink reference signal precoded by the target analog precoding matrix.

In a possible embodiment of the present disclosure, the CSI feedback method further includes, at the target analog precoding matrix using stage of the analog precoding period, in the case that the base station has determined that a predetermined condition of reselecting a new target analog precoding matrix has been met, proceeding to a next analog precoding period.

In yet another aspect, the present disclosure provides in some embodiments a CSI feedback method for the above-mentioned massive digital-analog hybrid antenna, including steps of: at an analog precoding matrix selection stage of an analog precoding period, receiving, by a User Equipment (UE), a precoded downlink reference signal from a base station on a subframe corresponding to each time offset and feedback first-stage CSI and measurement information to the UE, the first-stage CSI being CSI calculated in accordance with a measurement result after the UE has measured a spatial channel in accordance with the received, precoded downlink reference signal, and the measurement information being an average value of Reference Signal Received Power (RSRP) values corresponding to the time offsets or an average value of Channel Quality Indicator (CQI) values corresponding to the time offsets; and at a target analog precoding matrix using stage of the analog precoding period, receiving, by the UE, the downlink reference signal precoded by a target analog precoding matrix from the base station on each predetermined subframe and feedback the second-stage CSI to the UE, the second-stage CSI being CSI calculated in accordance with a measurement result after the UE has measured the spatial channel in accordance with the received downlink reference signal precoded by the target analog precoding matrix.

According to the CSI feedback method in the embodiments of the present disclosure, it is able to remarkably reduce the number of digital antenna ports, and provide a sufficient narrow beam to achieve three-dimensional (3D) scanning, thereby to reduce the interference between the UEs and improve the throughput. As compared with the massive, full-digital antenna, it is able to reduce the calculation difficulty in the data transmission and the signal processing, improve the performance gain due to 3D beamforming and match an actual transmission capability of a channel, thereby to enable the base station to perform link adaptation in a more accurate manner.

In still yet another aspect, the present disclosure provides in some embodiments a CSI feedback device for the above-mentioned massive digital-analog hybrid antenna, including: a measurement unit configured to, at an analog precoding matrix selection stage of an analog precoding period, precode at each predetermined time offset a downlink reference signal using an analog precoding matrix corresponding to each time offset and a predetermined digital precoding matrix, and transmit the precoded downlink reference signal and receive first-stage CSI and measurement information fed back by a UE on a subframe corresponding to each time offset, the first-stage CSI being CSI calculated by the UE in accordance with a measurement result after the UE has measured a spatial channel in accordance with the received, precoded downlink reference signal, the measurement information being an average value of RSRP values corresponding to the time offsets or an average value of CQI values corresponding to the time offsets; a selection unit configured to generate a performance measurement value of the analog precoding matrix corresponding to each time offset in accordance with the measurement information fed back by the UE with respect to each time offset, and select a target analog precoding matrix from the analog precoding matrices; and a using unit configured to, at a target analog precoding matrix using stage of the analog precoding period, transmit the downlink reference signal precoded by the target analog precoding matrix on each predetermined subframe, and receive second-stage CSI fed back by the UE on each predetermined sub-frame, the second-stage CSI being CSI calculated by the UE in accordance with a measurement result after the UE has measured the spatial channel in accordance with the downlink reference signal precoded by the target analog precoding matrix.

According to the CSI feedback device in the embodiments of the present disclosure, it is able to remarkably reduce the number of digital antenna ports, and provide a sufficient narrow beam to achieve three-dimensional (3D) scanning, thereby to reduce the interference between the UEs and improve the throughput. As compared with the massive, full-digital antenna, it is able to reduce the calculation difficulty in the data transmission and the signal processing, improve the performance gain due to 3D beamforming and match an actual transmission capability of a channel, thereby to enable the base station to perform link adaptation in a more accurate manner.

In a possible embodiment of the present disclosure, the CSI feedback device further includes a preconfiguration unit configured to, at a preconfiguration stage, configure the analog precoding period, P time offsets and an analog precoding matrix group, the analog precoding period comprising an analog precoding matrix selection stage and a target precoding matrix using stage, the analog precoding matrix group including P predetermined analog precoding matrices, the P analog precoding matrices including P predetermined $1 \times N_V$ matrices, each time offset corresponding to one of the analog precoding matrices, and P being a positive integer.

In a possible embodiment of the present disclosure, at the analog precoding matrix selection stage of the analog precoding period, precoding at each time offset the downlink reference signal using the analog precoding matrix corresponding to each time offset and the predetermined digital precoding matrix, the measurement unit is further configured to, at the analog precoding matrix selection stage of the analog precoding period, configure at each time offset a corresponding analog precoding matrix for $N_V$ analog antenna ports in each column among $N_H \times N_V$ analog antenna ports through a control signal from a phase shifter of a base band, and configure a predetermined digital precoding matrix for $M_V$ digital antenna ports in each column among $N_H \times M_V$ digital antenna ports corresponding to the $N_V$ analog antenna ports in each column. The predetermined digital precoding matrix is a predetermined $1 \times M_V$ matrix.

In a possible embodiment of the present disclosure, during generating the performance measurement value of the analog precoding matrix corresponding to each time offset in accordance with the measurement information fed back by the UE with respect to each time offset and selecting the target analog precoding matrix from the analog precoding matrices, the selection unit is further configured to generate the performance measurement value corresponding to each analog precoding matrix in accordance with the measurement information fed back by the UE with respect to each time offset, and select the target analog precoding matrix in accordance with the performance measurement values of all the analog precoding matrices, the target analog precoding matrix having a maximum performance measurement value with respect to a predetermined parameter.

In a possible embodiment of the present disclosure, the CSI feedback device further includes a first configuration unit configured to, at the analog precoding matrix selection stage of the analog precoding period, prior to precoding the downlink reference signal by the base station, configure CSI-RS resources for $N_H \times 1$ digital antenna ports, the $N_H \times 1$ digital antenna ports being mapped on the basis of the predetermined analog precoding matrix and the predetermined digital precoding matrix, and the CSI-RS resources being used to transmit the precoded downlink reference signal.

In a possible embodiment of the present disclosure, the CSI feedback device further includes a second configuration unit configured to, at the target analog precoding matrix using stage of the analog precoding period, prior to precoding the downlink reference signal by the base station, configure CSI-RS resources for $N_H \times M_V$ digital antenna ports, the $N_H \times M_V$ digital antenna ports being mapped on the basis of the target analog precoding matrix, and the CSI-RS resources being used to transmit the downlink reference signal precoded by the target analog precoding matrix; or at the target analog precoding matrix using stage of the analog precoding period, prior to precoding the downlink reference signal by the base station, configure a first CSI-RS resource for $M_V$ digital antenna ports in any column among the $N_H \times M_V$ digital antenna ports, and configure a second CSI-RS resource for $N_H$ digital antenna ports in any row among the $N_H \times M_V$ digital antenna ports, the $N_H \times M_V$ digital antenna ports being mapped on the basis of the target analog precoding matrix, and the CSI-RS resources being used to transmit the downlink reference signal precoded by the target analog precoding matrix.

In a possible embodiment of the present disclosure, the CSI feedback device further includes a reselection unit configured to, at the target analog precoding matrix using stage of the analog precoding period, when a predetermined condition of reselecting a new target analog precoding matrix has been met, proceed to a next analog precoding period.

In still yet another aspect, the present disclosure provides in some embodiments a CSI feedback device for the above-mentioned massive digital-analog hybrid antenna, including: a first feedback unit configured to, at an analog precoding matrix selection stage of an analog precoding period, receive a precoded downlink reference signal from a base station on a subframe corresponding to each time offset, and feedback first-stage CSI and measurement information to the base station, the first-stage CSI being CSI calculated in accordance with a measurement result after a User Equipment (UE) has measured a spatial channel in accordance with the received, precoded downlink reference signal, and the measurement information being an average value of Reference Signal Received Power (RSRP) values corresponding to the time offsets or an average value of Channel Quality Indicator (CQI) values corresponding to the time offsets; and a second feedback unit configured to, at a target analog precoding matrix using stage of the analog precoding period, receive the downlink reference signal precoded by a target analog precoding matrix from the base station on each predetermined subframe, and feedback second-stage CSI to the base station, the second-stage CSI being CSI calculated in accordance with a measurement result after the UE has measured the spatial channel in accordance with the received downlink reference signal precoded by the target analog precoding matrix.

According to the CSI feedback device in the embodiments of the present disclosure, it is able to remarkably reduce the number of digital antenna ports, and provide a sufficient narrow beam to achieve three-dimensional (3D) scanning, thereby to reduce the interference between the UEs and improve the throughput. As compared with the massive, full-digital antenna, it is able to reduce the calculation difficulty in the data transmission and the signal processing, improve the performance gain due to 3D beamforming and match an actual transmission capability of a channel, thereby to enable the base station to perform link adaptation in a more accurate manner.

In still yet another aspect, the present disclosure provides in some embodiments a CSI feedback device for the above-mentioned massive digital-analog hybrid antenna, including a processor, a transceiver and a memory. The processor is configured to read a computer-readable program stored in the memory, so as to: at an analog precoding matrix selection stage of an analog precoding period, precode at each predetermined time offset a downlink reference signal using an analog precoding matrix corresponding to each time offset and a predetermined digital precoding matrix, and transmit the precoded downlink reference signal and receive first-stage CSI and measurement information fed back by a UE on a subframe corresponding to each time offset, the first-stage CSI being CSI calculated by the UE in accordance with a measurement result after the has measured a spatial channel in accordance with the received, precoded downlink reference signal, the measurement information being an average value of RSRP values corresponding to the time offsets or an average value of CQI values corresponding to the time offsets; generate a performance measurement value of the analog precoding matrix corresponding to each time offset in accordance with the measurement information fed back by the UE with respect to each time offset, and select a target analog precoding matrix from the analog precoding matrices; and at a target analog precoding matrix using stage of the analog precoding period, transmit the downlink reference signal precoded by the target analog precoding matrix on each predetermined subframe, and receive second-stage CSI fed back by the UE on each predetermined sub-frame, the second-stage CSI being CSI calculated by the UE in accordance with a measurement result after the UE has measured the spatial channel in accordance with the downlink reference signal precoded by the target analog precoding matrix. The transceiver is configured to receive and transmit data. The memory is configured to store therein data for the operation of the processor.

In still yet another aspect, the present disclosure provides in some embodiments a CSI feedback device for the above-mentioned massive digital-analog hybrid antenna, including a processor, a transceiver and a memory. The processor is configured to read a computer-readable program stored in the memory, so as to: at an analog precoding matrix selection stage of an analog precoding period, receive a precoded downlink reference signal from a base station on a subframe corresponding to each time offset, feedback first-stage CSI and measurement information to the base station, the first-stage CSI being CSI calculated in accordance with a measurement result after a User Equipment (UE) has measured a spatial channel in accordance with the received, precoded downlink reference signal, and the measurement information being an average value of Reference Signal Received Power (RSRP) values corresponding to the time offsets or an average value of Channel Quality Indicator (CQI) values corresponding to the time offsets; and at a target analog precoding matrix using stage of the analog precoding period, receive the downlink reference signal precoded by a target analog precoding matrix from the base station on each predetermined subframe, and feedback second-stage CSI to the base station, the second-stage CSI being CSI calculated in accordance with a measurement result after the UE has measured the spatial channel in accordance with the received downlink reference signal precoded by the target analog precoding matrix; the transceiver is configured to receive and transmit data; and the memory is configured to store therein data for the operation of the processor.

DETAILED DESCRIPTION OF THE EMBODIMENTS

An object of the present disclosure is to provide a massive digital-analog hybrid antenna, a CSI feedback method and a CSI feedback device, so as to meet the requirements on a high transmission rate in the case of a large number of transceivers and reduce the overhead on time/frequency resources due to a large number CSI-RSs.

The present disclosure provides in some embodiments a CSI feedback method, which includes steps of: at an analog precoding matrix selection stage of an analog precoding period, precoding, by a base station at each predetermined time offset, a downlink reference signal using an analog precoding matrix corresponding to each time offset and a predetermined digital precoding matrix, and transmitting the precoded downlink reference signal and receiving first-stage CSI and measurement information fed back by a UE on a subframe corresponding to each time offset, the first-stage CSI being CSI calculated by the UE in accordance with a measurement result after the UE has measured a spatial channel in accordance with the received, precoded downlink reference signal, the measurement information being an average value of RSRP values corresponding to the time offsets or an average value of CQI values corresponding to the time offsets; generating, by the base station, a performance measurement value of the analog precoding matrix corresponding to each time offset in accordance with the measurement information fed back by the UE with respect to each time offset, and selecting a target analog precoding matrix from the analog precoding matrices; and at a target analog precoding matrix using stage of the analog precoding period, transmitting, by the base station, the downlink reference signal precoded by the target analog precoding matrix on each predetermined subframe, and receiving second-stage CSI fed back by the UE on each predetermined sub-frame, the second-stage CSI being CSI calculated by the UE in accordance with a measurement result after the UE has measured the spatial channel in accordance with the downlink reference signal precoded by the target analog precoding matrix.

The present disclosure will be described hereinafter in more details in conjunction with the drawings and embodiments.

Figure 1:
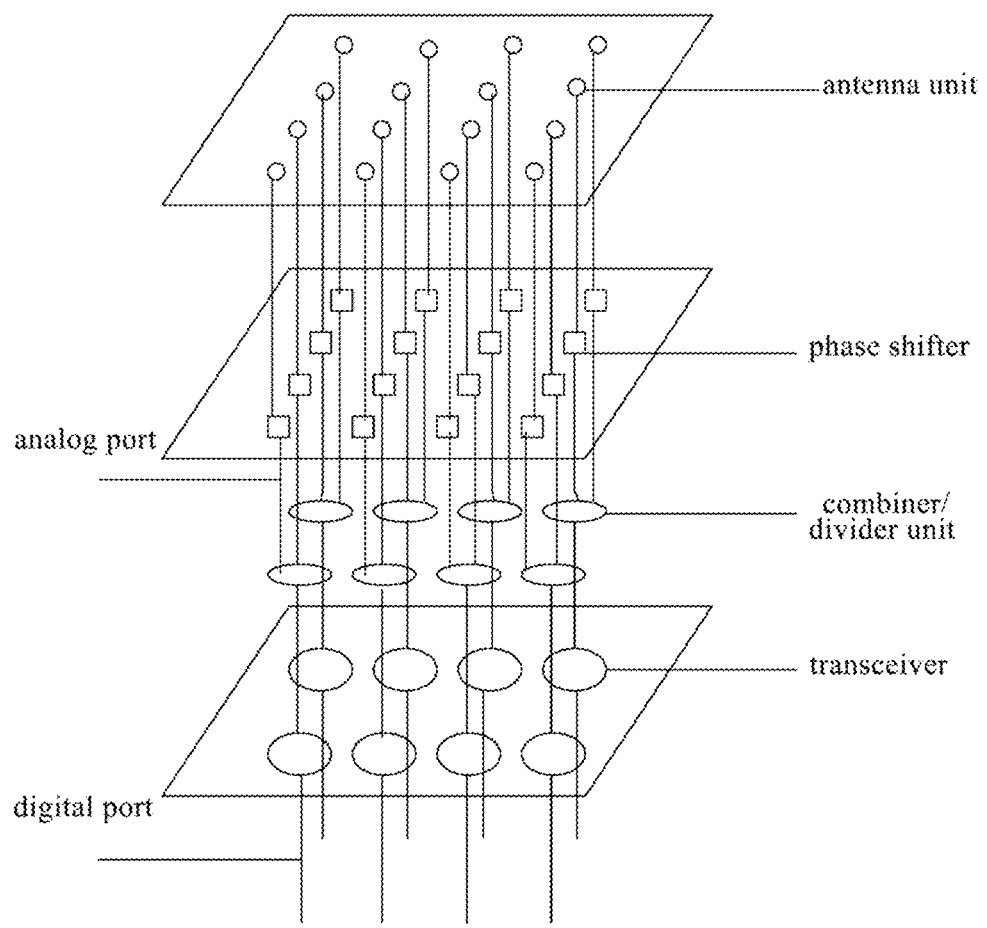
FIG. 1 is a schematic view showing a massive digital-analog hybrid antenna according to at least one embodiment of the present disclosure.

The present disclosure provides in some embodiments a massive digital-analog hybrid antenna which, as shown in FIG. 1, includes: $N_H \times N_V$ analog antenna ports corresponding to $N_H \times N_V$ phase shifters and $N_H \times M_V$ digital antenna ports corresponding to $N_H \times M_V$ transceivers. Each phase shifter corresponds to one analog antenna port. First ends of the $N_H \times N_V$ phase shifters are each connected to a corresponding one of $N_H \times N_V$ antenna units forming a planar array, second ends of the $N_H \times N_V$ phase shifters are divided into $N_H \times M_V$ groups each connected to a corresponding one of $N_H \times M_V$ combiner/divider units, each group of phase shifters correspond to $K_V$ channels, and $N_V = M_V K_V$. Each transceiver corresponds to one digital antenna port, and one end of each of the $N_H \times M_V$ transceivers is connected to a corresponding one of the $N_H \times M_V$ combiner/divider units.

To be specific, $N_H$ represents the number of the antenna units, the phase shifters, the combiner/divider units or the transceivers in each row, $N_V$ represents the number of the antenna units or phase shifters in each column, and $M_V$ represents the number of the combiner/divider units or transceivers in each column.

In addition, the first ends of the $N_H \times N_V$ phase shifters are connected to the $N_H \times N_V$ antenna units forming the planar array respectively, the $N_H \times N_V$ antenna units may include $N_H \times N_V$ single-polarization antenna elements or $N_H/2 \times N_V$ double-polarization antenna elements.

Figure 2:
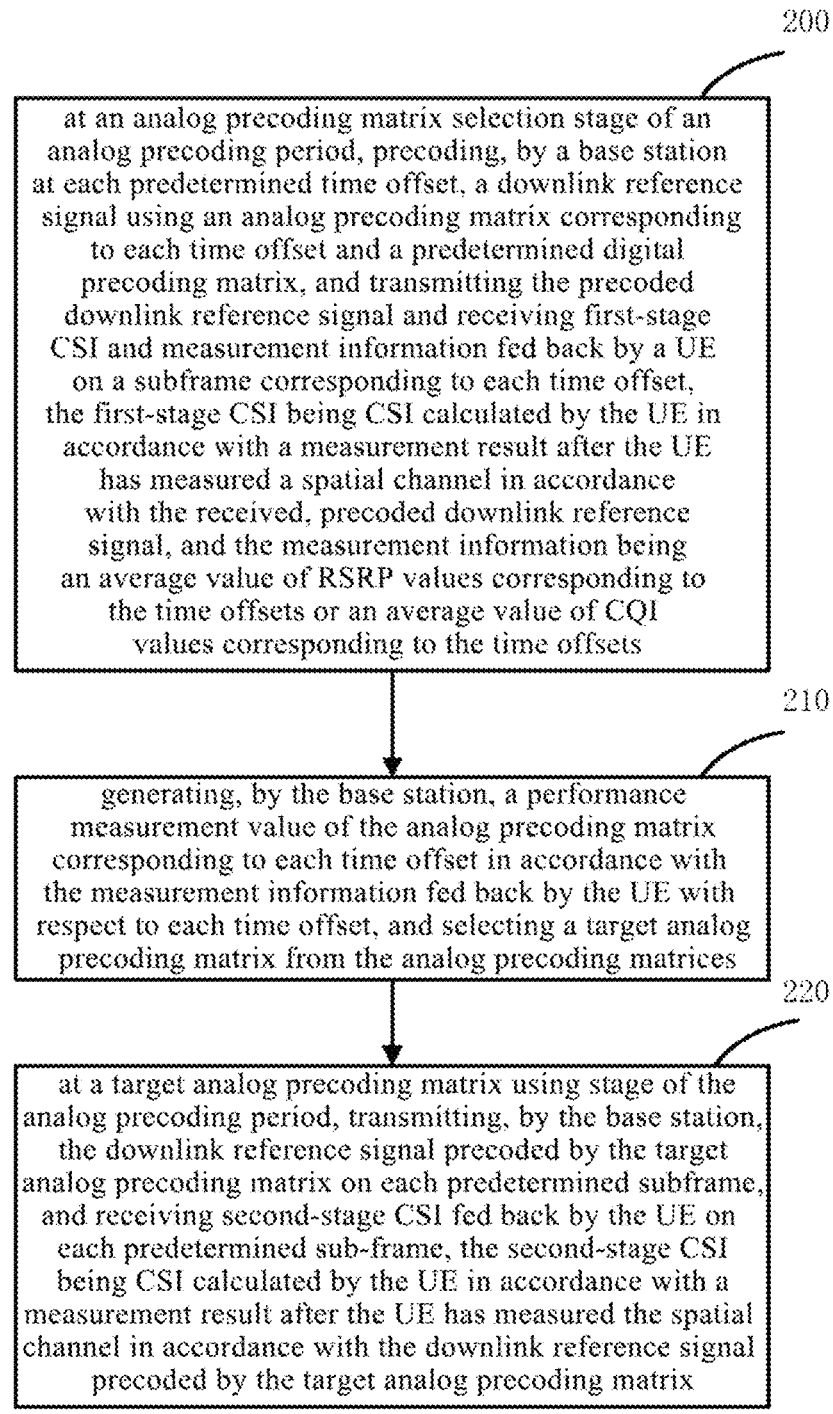
FIG. 2 is a flow chart of a CSI feedback method for the massive digital-analog hybrid antenna at a base station side according to at least one embodiment of the present disclosure.
Figure 3:
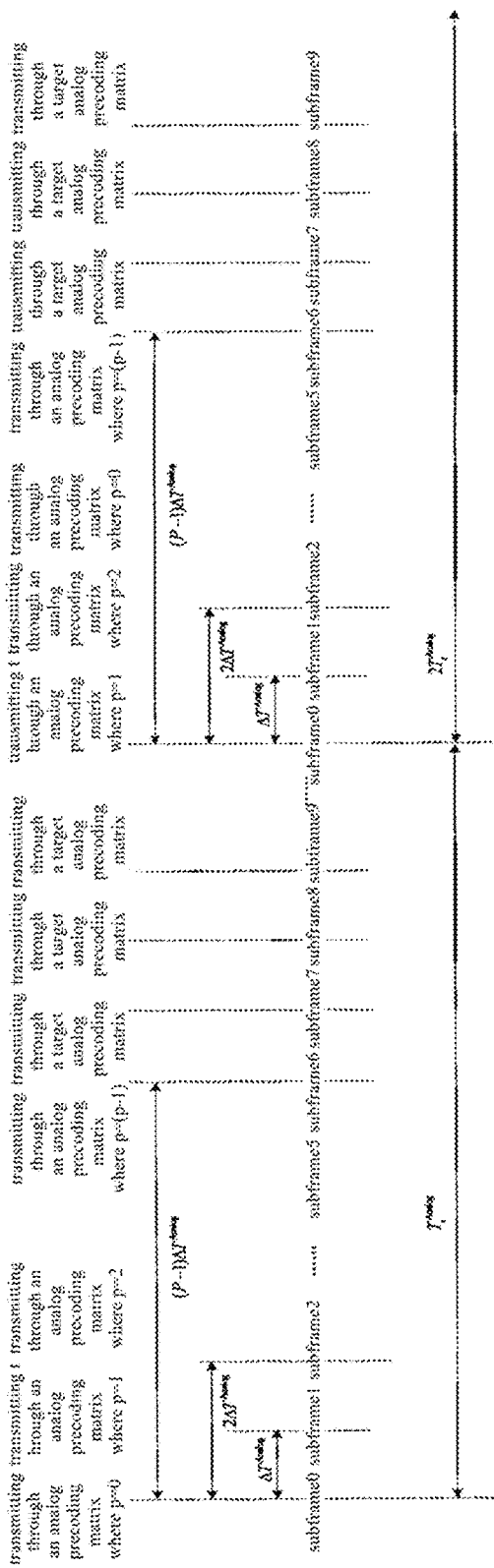
FIG. 3 is a schematic view showing an analog precoding period on the basis of the massive digital-analog hybrid antenna according to at least one embodiment of the present disclosure.

Referring to FIGS. 2 and 3, the CSI feedback procedure on the basis of the massive digital-analog hybrid antenna will be described as follows.

At a preconfiguration stage, a base station may configure an analog precoding period, P time offsets and an analog precoding matrix group.

The analog precoding period includes an analog precoding matrix selection stage and a target precoding matrix using stage. The analog precoding matrix group includes P predetermined analog precoding matrices, i.e., P predetermined $1 \times N_V$ matrices. Each time offset corresponds to one analog precoding matrix. P is a positive integer.

Referring to FIG. 3, the base station may configure the analog precoding period $T_s^{Analog}$, usually on a subframe-length basis. Within each analog precoding period $T_s^{Analog}$, P time offsets $\Delta T^{Analog}$ are provided, usually also on a subframe-length basis. $\Delta T^{Analog}$ may be N times of a subframe length, N may be determined in accordance with a phase shifting time period of the phase shifter, and an $i^{th}$ time offset may be represented as $i\Delta T^{Analog}$. In FIG. 3, $\Delta T^{Analog}$ refers to one subframe interval.

Figure 4:
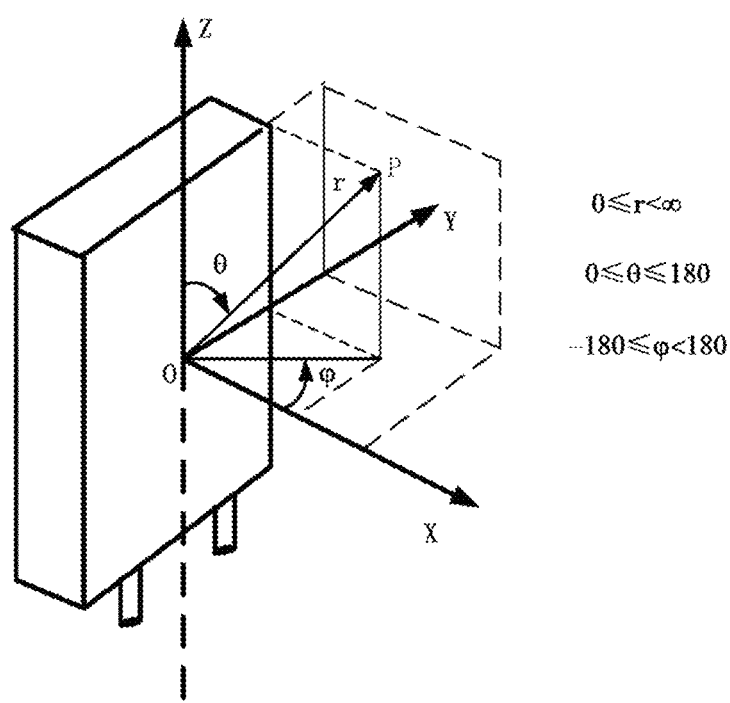
FIG. 4 is a schematic view showing a pitch angle for analog precoding on the basis of the massive digital-analog hybrid antenna according to at least one embodiment of the present disclosure.

To be specific, the base station may configure P analog precoding matrices, which form an analog precoding matrix group $W_V^{Analog}$ ($W_V^{Analog} \in C^{N_V \times P}$) in a vertical direction. Each analog precoding matrix in the analog precoding matrix group corresponds to one pitch angle which refers to an angle between a vector $\vec{r}$ and a Z-axis direction. As shown in FIG. 4, $0 \le \theta \le 180°$. The P analog precoding matrices are set in accordance with a coverage range of a wireless network in the vertical direction.

A $p^{th}$ analog precoding matrix $w_{V,p}^{Analog}$ ($w_{V,p}^{Analog} \in C^{N_V \times 1}$) in the analog precoding matrix group corresponds to a pitch angle $\theta_{etilt,p}$. $w_{V,p}^{Analog}$ may be calculated through the following equation:

$$w_{V,p}^{Digital} = \begin{bmatrix} w_{V,p,1}^{Analog}(\theta_{etilt,p}) \\ w_{V,p,2}^{Analog}(\theta_{etilt,p}) \\ \vdots \\ w_{V,p,n_V}^{Analog}(\theta_{etilt,p}) \\ \vdots \\ w_{V,p,N_V}^{Analog}(\theta_{etilt,p}) \end{bmatrix}, \quad (1)$$

where $$w_{V,p,n_V}^{Analog}(\theta_{etilt,p}) = \frac{1}{\sqrt{N_V}} \exp\left(-j\frac{2\pi}{\lambda}(n_V-1)d_V \cos\theta_{etilt,p}\right),$$

where $n_V=1, 2, \ldots, N_V$. Further, the base station may also configure Q digital precoding matrices forming a digital precoding matrix group $W_V^{Digital}$ ($W_V^{Digital} \in C^{M_V \times Q}$) in the vertical direction. A $q^{th}$ digital precoding matrix in the digital precoding matrix group may be represented as $w_{V,q}^{Digital}$ ($w_{V,q}^{Digital} \in C^{M_V \times 1}$). $w_{V,q}^{Digital}$ ($w_{V,q}^{Digital} \in C^{M_V \times 1}$) may be calculated through the following equation:

$$w_{V,q}^{Digital} = \begin{bmatrix} w_{V,q,1}^{Digital} \\ w_{V,q,2}^{Digital} \\ \vdots \\ w_{V,q,m_V}^{Digital} \\ \vdots \\ w_{V,q,M_V}^{Digital} \end{bmatrix}, \quad (2)$$

where $$w_{V,q,m_V}^{Digital} = \exp\left(-j2\pi\frac{(m_V-1)q}{Q}\right),$$

where, $m_V=1, 2, \ldots, M_V$; $q=0, 1, \ldots, Q-1$, and Q has a preset value.

In addition, the base station may further configure z digital precoding matrices forming a digital precoding matrix group $W_H^{Digital}$ ($W_H^{Digital} \in C^{N_H \times Z}$) in a horizontal direction. A $z^{th}$ digital precoding matrix in the digital precoding matrix group in the horizontal direction may be represented as $W_H^{Digital}$ ($W_H^{Digital} \in C^{N_H \times Z}$). $W_H^{Digital}$ ($W_H^{Digital} \in C^{N_H \times Z}$) may be calculated through the following equation:

$$w_{H,z}^{Digital} = \begin{bmatrix} w_{H,z,1}^{Digital} \\ w_{H,z,2}^{Digital} \\ \vdots \\ w_{H,z,n_H}^{Digital} \\ \vdots \\ w_{H,z,n_H}^{Digital} \end{bmatrix}, \quad (3)$$

where $$w_{H,z,n_h}^{Digital} = \exp\left(-j2\pi\frac{(n_H-1)z}{Z}\right),$$

where, $n_H=1, 2, \ldots, N_H$; $z=0, 1, \ldots, Z-1$, and Z has a preset value.

The present disclosure provides in some embodiments a CSI feedback method for a massive digital-analog hybrid antenna at a base station side, which includes the following steps.

Step 200: at an analog precoding matrix selection stage of an analog precoding period, precoding, by a base station at each predetermined time offset, a downlink reference signal using an analog precoding matrix corresponding to each time offset and a predetermined digital precoding matrix, and transmitting the precoded downlink reference signal and receiving first-stage CSI and measurement information fed back by a UE on a subframe corresponding to each time offset. The first-stage CSI is CSI calculated by the UE in accordance with a measurement result after the UE has measured a spatial channel in accordance with the received, precoded downlink reference signal, and the measurement information is an average value of RSRP values corresponding to the time offsets or an average value of CQI values corresponding to the time offsets.

The CSI may include a CQI, a Rank Indicator (RI) and a Precoding Matrix Indicator (PMI). The PMI may be represented as $w_{H,PMI}^{Digital}$ ($w_{H,PMI}^{Digital} \in C^{N_H \times R_H}$), where $R_H$ represents the number of columns (ranks) of the precoding matrix in a horizontal dimension, and it is determined in accordance with the RI.

At the analog precoding matrix selection stage of the analog precoding period, by taking an $i^{th}$ time offset in P predetermined time offsets as an example, the base station may precode the downlink reference signal using an $i^{th}$ analog precoding matrix corresponding to the $i^{th}$ time offset and the predetermined digital precoding matrix.

A precoding procedure at the analog precoding matrix selection stage will be described as follows. The base station may, at the $i^{th}$ time offset in the P predetermined time offsets, configure an $i^{th}$ analog precoding matrix for $N_V$ analog antenna ports in each column among $N_H \times N_V$ analog antenna ports through a control signal from a phase shifter of a base band, and further configure a predetermined digital precoding matrix for $M_V$ digital antenna ports in each column among $N_H \times M_V$ digital antenna ports corresponding to the $N_V$ analog antenna ports in each column. The $i^{th}$ analog precoding matrix is an $i^{th}$ predetermined $1 \times N_V$ matrix, and the predetermined digital precoding matrix is a predetermined $1 \times M_V$ matrix.

To be specific, the predetermined digital precoding matrix may be a $1 \times M_V$ matrix which may be calculated through the following equation:

$$w_{V,q=0}^{Digital} = \begin{bmatrix} 1 \\ 1 \\ \vdots \\ 1 \\ \vdots \\ 1 \end{bmatrix}. \quad (4)$$

At this time, for the massive digital-analog hybrid antenna at each time offset $i\Delta T^{Analog}$, CSI-RSs for the $N_H$ digital antenna ports in each row in the horizontal direction are identical to each other.

Step 210: generating, by the base station, a performance measurement value of the analog precoding matrix corresponding to each time offset in accordance with the measurement information fed back by the UE with respect to each time offset, and selecting a target analog precoding matrix from the analog precoding matrices.

To be specific, at the analog precoding matrix selection stage of the analog precoding period, the base station may generate the performance measurement value of each analog precoding matrix in accordance with the measurement information fed back by the UE with respect to each time offset. For example, it may take a sum of all the received measurement information corresponding to the $i^{th}$ time offset as the performance measurement value of the analog precoding matrix corresponding to the time offset.

The base station may select the target analog precoding matrix in accordance with the performance measurement values of all the analog precoding matrices. The performance measurement value of the target analog precoding matrix has a maximum value with respect to a predetermined parameter, i.e., the analog precoding matrix with the maximum performance measurement value may be selected as the target analog precoding matrix in accordance with the predetermined parameter. For example, the analog precoding matrix corresponding to the maximum performance measurement value among the acquired P performance measurement values may be selected as the target analog precoding matrix in a current analog precoding period.

Step 220: at a target analog precoding matrix using stage of the analog precoding period, transmitting, by the base station, the downlink reference signal precoded by the target analog precoding matrix on each predetermined subframe, and receiving second-stage CSI fed back by the UE on each predetermined sub-frame. The second-stage CSI is CSI calculated by the UE in accordance with a measurement result after the UE has measured the spatial channel in accordance with the downlink reference signal precoded by the target analog precoding matrix.

Further, at the analog precoding matrix selection stage of the analog precoding period, prior to the step of precoding, by the base station, the downlink reference signal, the base station may configure CSI-RS resources for $N_H \times 1$ digital antenna ports. The $N_H \times 1$ digital antenna ports are mapped on the basis of the predetermined analog precoding matrix and the predetermined digital precoding matrix. CSI-RS resources are used to transmit precoded downlink reference signals.

Thus, at the analog precoding matrix selection stage of the analog precoding period, the base station may configure CSI-RS resources for $N_H \times 1$ digital antenna ports. The $N_H \times 1$ digital antenna ports are mapped on the basis of the predetermined analog precoding matrix and the predetermined digital precoding matrix. The UE may feed back the first-stage CSI and the measurement information calculated in accordance with the measurement result, i.e., the CSI for the $N_H \times 1$ digital antenna ports.

At the target analog precoding matrix using stage of the analog precoding period, prior to the step of precoding, by the base station, the downlink reference signal, the base station may configure the CSI-RS resources in the following two modes. In a first mode, the base station may configure the CSI-RS resources for $N_H \times M_V$ digital antenna ports. The $N_H \times M_V$ digital antenna ports may be mapped on the basis of the target analog precoding matrix, and the CSI-RS resources are used to transmit the downlink reference signal precoded by the target analog precoding matrix. In a second mode, the base station may configure a first CSI-RS resource for $M_V$ digital antenna ports in any column among the $H_H \times M_V$ digital antenna ports, and configure a second CSI-RS resource for $N_H$ digital antenna ports in any row among the $N_H \times M_V$ digital antenna ports. The $N_H \times M_V$ digital antenna ports may be mapped on the basis of the target analog precoding matrix, and the CSI-RS resources are used to transmit the downlink reference signal precoded by the target analog precoding matrix.

At the target analog precoding matrix using stage of the analog precoding period, with respect to the first mode, the base station may configure the CSI-RS resources for the $N_H \times M_V$ digital antenna ports, and then the UE may calculate second-stage CSI in accordance with a measurement result acquired by measuring a spatial channel, i.e., the CSI for the $N_H \times M_V$ digital antenna ports.

At the target analog precoding matrix using stage of the analog precoding period, with respect to the second mode, the base station may configure for one UE two CSI-RS resources, so as to ensure that the UE may measure all the $N_H \times M_V$ digital antenna ports and feed back a pair of CSI to the base station. One of the pair of CSI corresponds to $N_H$ digital antenna ports of a virtual massive antenna in the horizontal direction, and the other corresponds to $M_V$ antenna ports in the vertical direction. The two CSI-RS resources may be configured within an identical subframe or in different subframes. The two CSI-RS resources may be provided to the UE so as to measure a channel $H_V$ for the digital antenna ports in the vertical direction and a channel $H_H$ for the digital antenna ports in the horizontal direction respectively. Through measuring the channels $H_V$ and $H_H$, the UE may calculate the second-stage CSI (including a PMI, a RI and a CQI), and then feed back the PMI, the RI and the CQI to the base station.

Upon the reception of the PMI, the RI and the CQI from the UE, the base station may calculate a parameter for link adaptation.

In addition, at the target analog precoding matrix using stage of the analog precoding period, when the base station has determined that a predetermined condition of reselecting a new target analog precoding matrix has been met, the precoding procedure may enter a next analog precoding period. Here, the new target analog precoding matrix may be reselected in accordance with a predetermined time period, or in accordance with the practical need.

Figure 5:
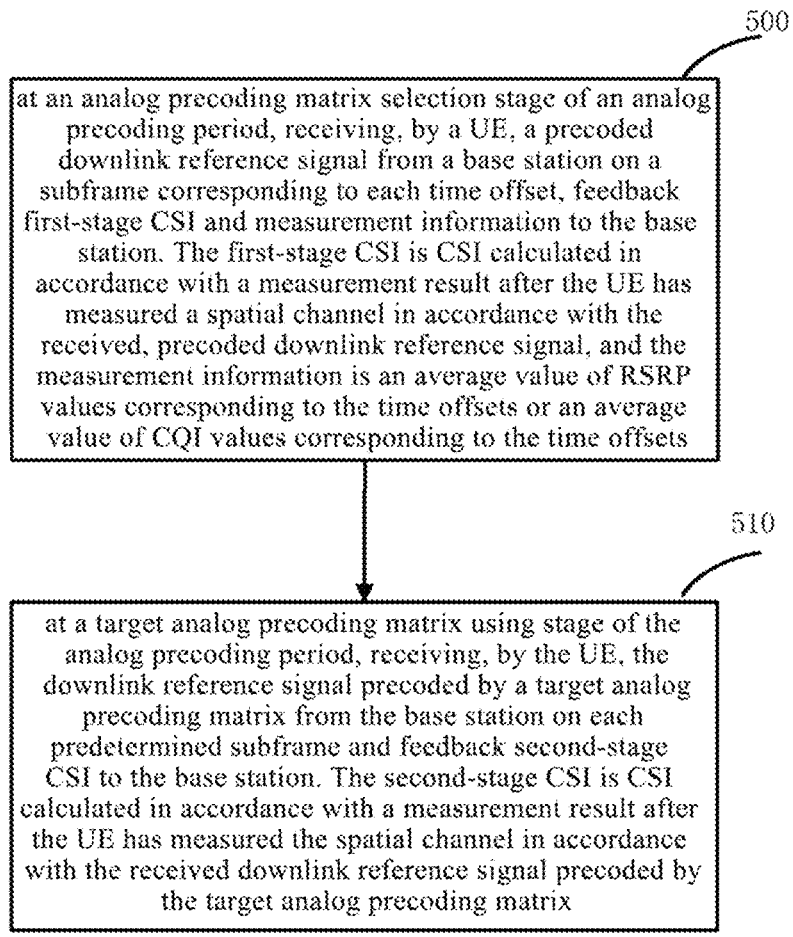
FIG. 5 is another schematic view showing the CSI feedback method for the massive digital-analog hybrid antenna at a UE side according to at least one embodiment of the present disclosure.

The present disclosure further provides in some embodiments a CSI feedback method for the massive digital-analog hybrid antenna at a UE side, which, as shown in FIG. 5, includes the following steps.

Step 500: at an analog precoding matrix selection stage of an analog precoding period, receiving, by a UE, a precoded downlink reference signal, first-stage CSI and measurement information from a base station on a subframe corresponding to each time offset. The first-stage CSI is CSI calculated in accordance with a measurement result after the UE has measured a spatial channel in accordance with the received, precoded downlink reference signal, and the measurement information is an average value of RSRP values corresponding to the time offsets or an average value of CQI values corresponding to the time offsets.

Step 510: at a target analog precoding matrix using stage of the analog precoding period, receiving, by the UE, the downlink reference signal precoded by a target analog precoding matrix and second-stage CSI from the base station on each predetermined subframe. The second-stage CSI is CSI calculated in accordance with a measurement result after the UE has measured the spatial channel in accordance with the received downlink reference signal precoded by the target analog precoding matrix.

The UE may receive the downlink reference signal through CSI-RS resources configured by the base station, measure the spatial channel in accordance with the downlink reference signal, and then calculate the corresponding CSI in accordance with the measurement result.

The CSI feedback procedure for the massive digital-analog hybrid antenna will be described hereinafter by taking the measurement information which is an average value of CQI values corresponding to the $i^{th}$ time offset as an example. The average value of the CQI values corresponding to the $i^{th}$ time offset is just an average value of $N_H$ CQI values.

At a preconfiguration stage, the base station may configure the analog precoding period, P time offsets, and an analog precoding matrix group.

At the analog precoding matrix selection stage of the analog precoding period, the base station may, at the $i^{th}$ time offset among the P predetermined time offsets, precode the downlink reference signal using the analog precoding matrix corresponding to the $i^{th}$ time offset and the predetermined digital precoding matrix, and transmit the precoded downlink reference signal on a subframe corresponding to the $i^{th}$ time offset.

The UE may receive the precoded downlink reference signal from the base station and feed back the first-stage CSI and the measurement information to the base station on the subframe corresponding to the $i^{th}$ time offset among the P predetermined time offsets.

The UE may receive the precoded downlink reference signal through CSI-RS resources configured by the base station at the ith time offset, acquire through measurement information about the spatial channel for $N_H$ digital antenna ports in one row through the following equation: $H_H(i) = [H_h^{n_H}(i), \ldots, H_h^{n_H}(i), \ldots H_h^{N_H}(i)]^T$, and then calculate the first-stage CSI and the measurement information in accordance with the information about the spatial channel.

The UE may calculate the CQI values $CQI_H^{n_H}(i)$ for the digital antenna ports in one row at the $i^{th}$ time offset in accordance with $H_H(i)$, and acquire an average value of the $N_H$ CQI values at the $i^{th}$ time offset through the following equation:

$$\overline{CQI_H}(i) = \frac{1}{N_H} \sum_{n_H=1}^{N_H} CQI_H^{n_H}(i).$$

The UE may report the PMI, the RI, the CQI and the average values $\overline{CQI_H^{n_{UE}}}(i)$ of the CQI values at the $i^{th}$ time offset to the base station, where $n_{UE}$ represents a serial number of the UE.

Upon the receipt of the PMI, the RI and the CQI from all the UEs, the base station may calculate a parameter for link adaptation.

The base station may, in accordance with measurement information $\overline{CQI_H^{n_{UE}}}(i)$, $n_{UE}=0, 1, \ldots, N_{UE}-1$ (where $N_{UE}$ represents the number of UEs at one sector or cell) about the precoded downlink reference signal fed back by all the UEs at each time offset, generate a sum of the measurement information of all the UEs corresponding to each time offset through the following equation $$CQI_H^{Sum}(i) = \sum_{n_{UE}=0}^{N_{UE}-1} \overline{CQI_H^{n_{UE}}}(i)$$

as the performance measurement value of each analog precoding matrix.

The base station may select the target analog precoding matrix $W_{V,i,Optimal}^{Analog}$ in accordance with the performance measurement values $CQI_H^{Sum}(i)$, $i=1, 2, \ldots, P$ of all the P analog precoding matrices. The target analog precoding matrix $$W_{V,i,Optimal}^{Analog}$$

refers to an analog precoding matrix corresponding to i th performance measurement values which is the maximum value among the P performance measurement values $CQI_H^{Sum}(i)$, $i=1, 2, \ldots, P$.

At the target analog precoding matrix using stage of the analog precoding period, the base station may transmit the downlink reference signal precoded by the target analog precoding matrix and receive second-stage CSI fed back by the UE on each predetermined subframe after a $P^{th}$ time offset.

The UE may receive the downlink reference signal precoded by the target analog precoding matrix through two CSI-RS resources configured by the base station, acquire, through measurement, information about spatial channels for $N_H$ digital antenna ports in one row and information about spatial channels for $M_V$ digital antenna ports in one column, and calculate the second-stage CSI, i.e., a pair of CSI, in accordance with the two pieces of information about the spatial channels.

The CSI feedback procedure for the massive digital-analog hybrid antenna will be described hereinafter by taking the measurement information which is an average value of the RSRP values corresponding to the $i^{th}$ time offset as an example. The average value of the RSRP values corresponding to the $i^{th}$ time offset is just an average value of $N_H$ RSRP values.

At the preconfiguration stage, the base station may configure the analog precoding period, P time offsets, and an analog precoding matrix group.

At the analog precoding matrix selection state of the analog precoding period, the base station may precode, at the $i^{th}$ time offset among the P predetermined time offsets, the downlink reference signal using the analog precoding matrix corresponding to the $i^{th}$ time offset and the predetermined digital precoding matrix, and transmit the precoded downlink reference signal on a subframe corresponding to the $i^{th}$ time offset.

The UE may receive the precoded downlink reference signal from the base station and feed back the first-stage CSI and the measurement information to the base station on the subframe corresponding to the $i^{th}$ time offset among the P predetermined time offsets.

The UE may receive the precoded downlink reference signal through the CSI-RS resources configured by the base station at the $i^{th}$ time offset, acquire, through measurement, the information about the spatial channel corresponding to $N_H$ digital antenna ports in one row through the following equation: $H_H(i) = [H_h^{n_H}(i), \ldots, H_h^{n_H}(i), \ldots, H_h^{N_H}(i)]^T$, and calculate the first-stage CSI and the measurement information in accordance with the information about the spatial channel.

The UE may calculate the RSRP values $RSRP_H^{n_H}(i)$ for the digital antenna ports in one row at the $i^{th}$ time offset in accordance with $H_H(i)$, and acquire an average value of the $N_H$ RSRP values at the $i^{th}$ time offset through the following equation:

$$\overline{RSRP_H}(i) = \frac{1}{N_H} \sum_{n_H=1}^{N_H} RSRP_H^{n_H}(i).$$

The UE may then report the PMI, the RI, the CQI and the average value of the RSRP values $\overline{RSRP_H^{n_{UE}}}(i)$ at the $i^{th}$ time offset to the base station, where $n_{UE}$ represents a serial number of the UE.

Upon the receipt of the PMI, the RI and the CQI from all the UEs, the base station may calculate a parameter for link adaptation.

The base station may, in accordance with measurement information $\overline{RSRP_H^{n_{UE}}}(i)$, $n_{UE}=0, 1, \ldots, N_{UE}-1$ (where $N_{UE}$ represents the number of UEs at one sector or cell) about the precoded downlink reference signal fed back by all the UEs at each time offset, generate a sum of the measurement information of all the UEs corresponding to each time offset through the following equation $$RSRP_H^{Sum}(i) = \sum_{n_{UE}=0}^{N_{UE}-1} \overline{RSRP_H^{n_{UE}}}(i)$$

as the performance measurement value of each analog precoding matrix.

The base station may select the target analog precoding matrix $$w_{V,i Optimal}^{Analog}$$

in accordance with the performance measurement values $RSRP_H^{Sum}$ (i), i=1, 2, . . . , P of all the P analog precoding matrices. The target analog precoding matrix $$w_{V,i Optimal}^{Analog}$$

refers to an analog precoding matrix corresponding to i th performance measurement value which is the maximum value among the P $RSRP_H^{Sum}$ (i), i=1, 2, . . . , P.

At the target analog precoding matrix using stage of the analog precoding period, the base station may transmit the downlink reference signal precoded by the target analog precoding matrix and receive second-stage CSI fed back by the UE on each predetermined subframe after a $P^{th}$ time offset.

The UE may receive the downlink reference signal precoded by the target analog precoding matrix through two CSI-RS resources configured by the base station, acquire, through measurement, information about spatial channels for $N_H$ digital antenna ports in one row and information about spatial channels for $M_V$ digital antenna ports in one column, and calculate the second-stage CSI, i.e., a pair of CSI, in accordance with the two pieces of information about the spatial channels.

Figure 6:
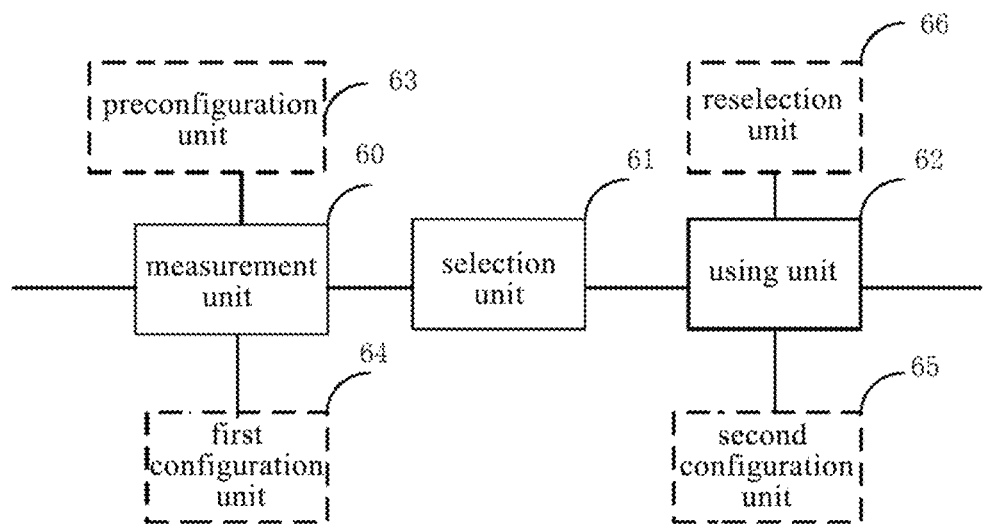
FIG. 6 is a schematic view showing a CSI feedback device for the massive digital-analog hybrid antenna at the base station side according to at least one embodiment of the present disclosure.

The present disclosure further provides in some embodiments a CSI feedback device for a massive digital-analog hybrid antenna which, as shown in FIG. 6, includes: a measurement unit 60 configured to, at an analog precoding matrix selection stage of an analog precoding period, precode at each predetermined time offset a downlink reference signal using an analog precoding matrix corresponding to each time offset and a predetermined digital precoding matrix, and transmit the precoded downlink reference signal and receive first-stage CSI and measurement information fed back by a UE on a subframe corresponding to each time offset, the first-stage CSI being CSI calculated by the UE in accordance with a measurement result after the UE has measured a spatial channel in accordance with the received, precoded downlink reference signal, the measurement information being an average value of RSRP values corresponding to the time offsets or an average value of CQI values corresponding to the time offsets; a selection unit 61 configured to generate a performance measurement value of the analog precoding matrix corresponding to each time offset in accordance with the measurement information fed back by the UE with respect to each time offset, and select a target analog precoding matrix from the analog precoding matrices; and a using unit 62 configured to, at a target analog precoding matrix using stage of the analog precoding period, transmit the downlink reference signal precoded by the target analog precoding matrix on each predetermined subframe, and receive second-stage CSI fed back by the UE on each predetermined sub-frame, the second-stage CSI being CSI calculated by the UE in accordance with a measurement result after the UE has measured the spatial channel in accordance with the downlink reference signal precoded by the target analog precoding matrix.

According to the CSI feedback device in the embodiments of the present disclosure, it is able to remarkably reduce the number of digital antenna ports, and provide a sufficient narrow beam to achieve three-dimensional (3D) scanning, thereby to reduce the interference between the UEs and improve the throughput. As compared with the massive, full-digital antenna, it is able to reduce the calculation difficulty in the data transmission and the signal processing, improve the performance gain due to 3D beamforming and match an actual transmission capability of a channel, thereby to enable the base station to perform link adaptation in a more accurate manner.

In a possible embodiment of the present disclosure, the CSI feedback device further includes a preconfiguration unit 63 configured to, at a preconfiguration stage, configure the analog precoding period, P time offsets and an analog precoding matrix group. The analog precoding period includes an analog precoding matrix selection stage and a target precoding matrix using stage. The analog precoding matrix group includes P predetermined analog precoding matrices, the P analog precoding matrices includes P predetermined $1 \times N_V$ matrices, each time offset is corresponding to one of the analog precoding matrices, and P is a positive integer.

In a possible embodiment of the present disclosure, in the case of, at the analog precoding matrix selection stage of the analog precoding period, precoding at each predetermined time offset the downlink reference signal using the analog precoding matrix corresponding to each time offset and the predetermined digital precoding matrix, the measurement unit 60 is further configured to, at the analog precoding matrix selection stage of the analog precoding period, configure at each time offset a corresponding analog precoding matrix for $N_V$ analog antenna ports in each column among $N_H \times N_V$ analog antenna ports through a control signal from a phase shifter of a base band, and configure a predetermined digital precoding matrix for $M_V$ digital antenna ports in each column among $N_H \times M_V$ digital antenna ports corresponding to the $N_V$ analog antenna ports in each column. The predetermined digital precoding matrix is a predetermined $1 \times M_V$ matrix.

In a possible embodiment of the present disclosure, in the case of generating the performance measurement value of the analog precoding matrix corresponding to each time offset in accordance with the measurement information fed back by the UE with respect to each time offset and selecting the target analog precoding matrix from the analog precoding matrices, the selection unit 61 is further configured to generate the performance measurement value corresponding to each analog precoding matrix in accordance with the measurement information fed back by the UE with respect to each time offset, and select the target analog precoding matrix in accordance with the performance measurement values of all the analog precoding matrices, the target analog precoding matrix having a maximum performance measurement value with respect to a predetermined parameter.

In a possible embodiment of the present disclosure, the CSI feedback device further includes a first configuration unit 64 configured to, at the analog precoding matrix selection stage of the analog precoding period, prior to precoding the downlink reference signal, configure CSI-RS resources for $N_H \times 1$ digital antenna ports, the $N_H \times 1$ digital antenna ports being mapped on the basis of the predetermined analog precoding matrix and the predetermined digital precoding matrix, and the CSI-RS resources being used to transmit the precoded downlink reference signal.

In a possible embodiment of the present disclosure, the CSI feedback device further includes a second configuration unit 65 configured to, at the target analog precoding matrix using stage of the analog precoding period, prior to precoding the downlink reference signal, configure CSI-RS resources for $N_H \times M_V$ digital antenna ports, the $N_H \times M_V$ digital antenna ports being mapped on the basis of the target analog precoding matrix, and the CSI-RS resources being used to transmit the downlink reference signal precoded by the target analog precoding matrix; or at the target analog precoding matrix using stage of the analog precoding period, prior to precoding the downlink reference signal, configure a first CSI-RS resource for $M_V$ digital antenna ports in any column among the $N_H \times M_V$ digital antenna ports, and configure a second CSI-RS resource for $N_H$ digital antenna ports in any row among the $N_H \times M_V$ digital antenna ports, the $N_H \times M_V$ digital antenna ports being mapped on the basis of the target analog precoding matrix, and the CSI-RS resources being used to transmit the downlink reference signal precoded by the target analog precoding matrix.

In a possible embodiment of the present disclosure, the CSI feedback device further includes a reselection unit 66 configured to, at the target analog precoding matrix using stage of the analog precoding period, in the case that a predetermined condition of reselecting a new target analog precoding matrix has been met, proceed to a next analog precoding period.

Figure 7:
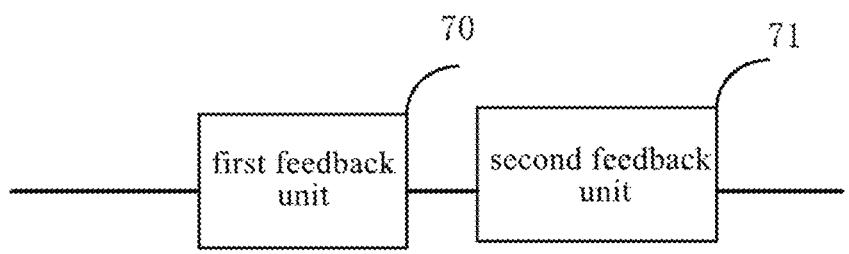
FIG. 7 is another schematic view showing the CSI feedback device for the massive digital-analog hybrid antenna at the UE side according to at least one embodiment of the present disclosure.

The present disclosure provides in some embodiments a CSI feedback device for a massive digital-analog hybrid antenna which, as shown in FIG. 7, includes: a first feedback unit 70 configured to, at an analog precoding matrix selection stage of an analog precoding period, receive a precoded downlink reference signal from a base station on a subframe corresponding to each time offset, and feedback the first-stage CSI and measurement information to the base station, the first-stage CSI being CSI calculated in accordance with a measurement result after a UE has measured a spatial channel in accordance with the received, precoded downlink reference signal, and the measurement information being an average value of RSRP values corresponding to the time offsets or an average value of CQI values corresponding to the time offsets; and a second feedback unit 71 configured to, at a target analog precoding matrix using stage of the analog precoding period, receive the downlink reference signal precoded by a target analog precoding matrix from the base station on each predetermined subframe and feedback and the second-stage CSI to the base station, the second-stage CSI being CSI calculated in accordance with a measurement result after the UE has measured the spatial channel in accordance with the received downlink reference signal precoded by the target analog precoding matrix.

According to the massive digital-analog hybrid antenna in the embodiments of the present disclosure, it is able to effectively reduce the number of the antenna ports. The $N_H \times N_V$ analog antenna ports correspond to the $N_H \times N_V$ phase shifters, each group of phase shifters correspond to $K_V$ channels, and $N_V = M_V K_V$. Each group of phase shifters may be connected to form a divider unit, so as to provide a radio frequency signal applied to one transceiver. At this time, the massive digital-analog hybrid antenna consisting of 128, 256 or 512 antenna units may merely include $128/K_V$, $256/K_V$ or $512/K_V$ transceivers and $128/K_V$, $256/K_V$ or $512/K_V$ antenna ports. Hence, it is able to remarkably reduce the number of the digital antenna ports to $1/K_V$ of the number of the antenna ports of a massive, full-digital antenna. Meanwhile, the present disclosure also provides an analog codebook design and selection method required by the phase shifters.

In addition, according to the massive digital-analog hybrid antenna in the embodiments of the present disclosure, it is able to remarkably reduce the number of digital antenna ports, and provide a sufficient narrow beam to achieve three-dimensional (3D) scanning, thereby to reduce the interference between the UEs and improve the throughput. As compared with the massive, full-digital antenna, it is able to reduce the calculation difficulty in the data transmission and the signal processing, improve the performance gain due to 3D beamforming and match an actual transmission capability of a channel, thereby to enable the base station to perform link adaptation in a more accurate manner.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A massive digital-analog hybrid antenna, comprising $N_H \times N_V$ analog antenna ports corresponding to $N_H \times N_V$ phase shifters and $N_H \times M_V$ digital antenna ports corresponding to $N_H \times M_V$ transceivers, wherein first ends of the $N_H \times N_V$ phase shifters are each connected to a corresponding one of $N_H \times N_V$ antenna units forming a planar array, second ends of the $N_H \times N_V$ phase shifters are divided into $N_H \times M_V$ groups each connected to a corresponding one of $N_H \times M_V$ combiner/divider units, each group of phase shifters correspond to $K_V$ channels, and $N_V = M_V K_V$; and one end of each of the $N_H \times M_V$ transceivers is connected to a corresponding one of the $N_H \times M_V$ combiner/divider units, wherein the $N_H \times 1$ digital antenna ports of the $N_H \times M_V$ digital antenna ports are mapped on the basis of a predetermined analog precoding matrix and a predetermined digital precoding matrix at an analog precoding matrix selection stage of an analog precoding period, and the $N_H \times M_V$ digital antenna ports are mapped on the basis of a target analog precoding matrix at a target analog precoding matrix using stage of the analog precoding period.

2. The massive digital-analog hybrid antenna according to claim 1, wherein the $N_H \times N_V$ antenna units comprise $N_H \times N_V$ single-polarization antenna elements or $N_H/2 \times N_V$ double-polarization antenna elements.

3. The massive digital-analog hybrid antenna according to claim 1, wherein the predetermined analog precoding matrix corresponds to the $N_H \times N_V$ analog antenna ports, the predetermined digital precoding matrix corresponds to the $N_H \times M_V$ digital antenna ports, and the target analog precoding matrix is selected from P of the predetermined analog precoding matrices based on channel measure, P being a positive integer, and $M_V \geq 2$.

4. The massive digital-analog hybrid antenna according to claim 1, wherein wherein at the analog precoding matrix selection stage of the analog precoding period, the predetermined analog precoding matrix is configured for $N_V$ analog antenna ports in each column among $N_H \times N_V$ analog antenna ports through a control signal from the $N_H \times N_V$ phase shifters of a base band; and wherein the predetermined digital precoding matrix is configured for $M_V$ digital antenna ports in each column among $N_H \times M_V$ digital antenna ports corresponding to the $N_V$ analog antenna ports in each column, wherein the predetermined digital precoding matrix is a predetermined $1 \times M_V$ matrix.

5. A Channel State information (CSI) feedback method of a massive digital-analog hybrid antenna, wherein the antenna comprises $N_H \times N_V$ analog antenna ports corresponding to $N_H \times N_V$ phase shifters and $N_H \times M_V$ digital antenna ports corresponding to $N_H \times M_V$ transceivers, first ends of the $N_H \times N_V$ phase shifters are each connected to a corresponding one of $N_H \times N_V$ antenna units forming a planar array, second ends of the $N_H \times N_V$ phase shifters are divided into $N_H \times M_V$ groups each connected to a corresponding one of $N_H \times M_V$ combiner/divider units, each group of phase shifters correspond to $K_V$ channels, and $N_V = M_V K_V$; and one end of each of the $N_H \times M_V$ transceivers is connected to a corresponding one of the $N_H \times M_V$ combiner/divider units, wherein the $N_H \times 1$ digital antenna ports of the $N_H \times M_V$ digital antenna ports are mapped on the basis of a predetermined analog precoding matrix and a predetermined digital precoding matrix at an analog precoding matrix selection stage of an analog precoding period, and the $N_H \times M_V$ digital antenna ports are mapped on the basis of a target analog precoding matrix at a target analog precoding matrix using stage of the analog precoding period, wherein the CSI feedback method comprises steps of:

at the analog precoding matrix selection of the analog precoding period, precoding, by a base station at each of a plurality of predetermined time offsets, a downlink reference signal using the analog precoding matrix corresponding to each time offset and the predetermined digital precoding matrix, and transmitting the precoded downlink reference signal and receiving first-stage CSI and measurement information fed back by a User Equipment (UE) on a subframe corresponding to each time offset, the first-stage CSI being CSI calculated by the UE in accordance with a measurement result after the UE has measured a spatial channel in accordance with the received, precoded downlink reference signal, the measurement information being an average value of Reference Signal Received Power (RSRP) values corresponding to the time offsets or an average value of Channel Quality Indicator (CQI) values corresponding to the time offsets;

generating, by the base station, a performance measurement value of the analog precoding matrix in accordance with the measurement information fed back by the UE with respect to each time offset, and selecting the target analog precoding matrix from the analog precoding matrices, wherein the target analog precoding matrix is one of the analog precoding matrices having the maximum performance measurement value with respect to the RSRP value or the CQI value; and at the target analog precoding matrix using stage of the analog precoding period, transmitting, by the base station, the downlink reference signal precoded by the target analog precoding matrix on each predetermined subframe, and receiving second-stage CSI fed back by the UE on each predetermined sub-frame, the second-stage CSI being CSI calculated by the UE in accordance with a measurement result after the UE has measured the spatial channel in accordance with the downlink reference signal precoded by the target analog precoding matrix, wherein the step of, at the analog precoding matrix selection stage of the analog precoding period, precoding, by the base station at each predetermined time offset, the downlink reference signal using the analog precoding matrix corresponding to each time offset and the predetermined digital precoding matrix comprises:

at the analog precoding matrix selection stage of the analog precoding period, configuring, by the base station at each time offset, the analog precoding matrix for $N_V$ analog antenna ports in each column among $N_H \times N_V$ analog antenna ports through a control signal from the $N_H \times N_V$ phase shifters of a base band; and configuring, by the base station, the predetermined digital precoding matrix for $M_V$ digital antenna ports in each column among $N_H \times M_V$ digital antenna ports corresponding to the $N_V$ analog antenna ports in each column wherein the predetermined digital precoding matrix is a predetermined $1 \times M_V$ matrix.

6. The CSI feedback method according to claim 5, further comprising, at a preconfiguration stage, configuring, by the base station, the analog precoding period, P time offsets and an analog precoding matrix group, the analog precoding matrix group comprising P predetermined analog precoding matrices, the P predetermined analog precoding matrices comprising P predetermined $1 \times N_V$ matrices, and each time offset corresponding to one of the analog precoding matrices, and P being a positive integer.

7. The CSI feedback method according to claim 5, wherein the step of generating, by the base station, the performance measurement value of the analog precoding matrix corresponding to each time offset in accordance with the measurement information fed back by the UE with respect to each time offset, and selecting the target analog precoding matrix from the analog precoding matrices comprises:
  generating, by the base station, the performance measurement value corresponding to each analog precoding matrix in accordance with the measurement information fed back by the UE with respect to each time offset; and
  selecting, by the base station, the target analog precoding matrix in accordance with the performance measurement values of all the analog precoding matrices, the target analog precoding matrix having a maximum performance measurement value with respect to a predetermined parameter.

8. The CSI feedback method according to claim 5, further comprising, at the analog precoding matrix selection stage of the analog precoding period, prior to the step of precoding, by the base station, the downlink reference signal, configuring, by the base station, CSI-RS resources for $N_H \times 1$ digital antenna ports, and the CSI-RS resources being used to transmit the precoded downlink reference signal.

9. The CSI feedback method according to claim 5, further comprising:
  at the target analog precoding matrix using stage of the analog precoding period, prior to the step of precoding, by the base station, the downlink reference signal, configuring, by the base station, CSI-RS resources for $N_H \times M_V$ digital antenna ports, and the CSI-RS resources being used to transmit the downlink reference signal precoded by the target analog precoding matrix; or
  at the target analog precoding matrix using stage of the analog precoding period, prior to the step of precoding, by the base station, the downlink reference signal, configuring, by the base station, a first CSI-RS resource for $M_V$ digital antenna ports in any column among the $N_H \times M_V$ digital antenna ports, and configuring, by the base station, a second CSI-RS resource for $N_H$ digital antenna ports in any row among the $N_H \times M_V$ digital antenna ports, the $N_H \times M_V$ digital antenna ports being mapped on the basis of the target analog precoding matrix, and the CSI-RS resources being used to transmit the downlink reference signal precoded by the target analog precoding matrix.

10. The CSI feedback method according to claim 5, further comprising: at the target analog precoding matrix using stage of the analog precoding period, in the case that the base station has determined that a predetermined condition of reselecting a new target analog precoding matrix has been met, proceeding to a next analog precoding period.

11. A Channel State Information (CSI) feedback device of a massive digital-analog hybrid antenna, comprising a processor, a first transceiver and a memory, wherein
  the processor is configured to execute the CSI feedback method according to claim 5, when reading a computer-readable program stored in the memory;
  the first transceiver is configured to receive and transmit data; and
  the memory is configured to store therein data for the operation of the processor.

12. The CSI feedback device according to claim 11, wherein the processor is further configured to, at a preconfiguration stage, configure the analog precoding period, P time offsets and an analog precoding matrix group, the analog precoding period comprising an analog precoding matrix selection stage and a target precoding matrix using stage, the analog precoding matrix group comprising P predetermined analog precoding matrices, the P analog precoding matrices comprising P predetermined $1 \times N_V$ matrices, each time offset corresponding to one of the analog precoding matrices, and P being a positive integer.

13. The CSI feedback device according to claim 11, wherein during generating the performance measurement value of the analog precoding matrix corresponding to each time offset in accordance with the measurement information fed back by the UE with respect to each time offset and selecting the target analog precoding matrix from the analog precoding matrices, the processor is further configured to:
  generate the performance measurement value corresponding to each analog precoding matrix in accordance with the measurement information fed back by the UE with respect to each time offset, and
  select the target analog precoding matrix in accordance with the performance measurement values of all the analog precoding matrices, the target analog precoding matrix having a maximum performance measurement value with respect to a predetermined parameter.

14. The CSI feedback device according to claim 11, wherein the processor is further configured to, at the analog precoding matrix selection stage of the analog precoding period, prior to precoding the downlink reference signal by the base station, configure CSI-Reference Signal (CSI-RS) resources for $N_H \times 1$ digital antenna ports, and the CSI-RS resources being used to transmit the precoded downlink reference signal.

15. The CSI feedback device according to claim 11, wherein the processor is further configured to:
  at the target analog precoding matrix using stage of the analog precoding period, prior to precoding the downlink reference signal by the base station, configure CSI-RS resources for $N_H \times M_V$ digital antenna ports, the $N_H \times M_V$ digital antenna ports being mapped on the basis of the target analog precoding matrix, and the CSI-RS resources being used to transmit the downlink reference signal precoded by the target analog precoding matrix; or
  at the target analog precoding matrix using stage of the analog precoding period, prior to precoding the downlink reference signal by the base station, configure a first CSI-RS resource for $M_V$ digital antenna ports in any column among the $N_H \times M_V$ digital antenna ports, and configure a second CSI-RS resource for $N_H$ digital antenna ports in any row among the $N_H \times M_V$ digital antenna ports, and the CSI-RS resources being used to transmit the downlink reference signal precoded by the target analog precoding matrix.

16. The CSI feedback device according to claim 11, wherein the processor is further configured to, at the target analog precoding matrix using stage of the analog precoding period, when a predetermined condition of reselecting a new target analog precoding matrix has been met, proceed to a next analog precoding period.

17. A Channel State Information (CSI) feedback method of a massive digital-analog hybrid antenna, wherein the antenna comprises $N_H \times N_V$ analog antenna ports corresponding to $N_H \times N_V$ phase shifters and $N_H \times M_V$ digital antenna ports corresponding to $N_H \times M_V$ transceivers, first ends of the $N_H \times N_V$ phase shifters are each connected to a corresponding one of $N_H \times N_V$ antenna units forming a planar array, second ends of the $N_H \times N_V$ phase shifters are divided into $N_H \times M_V$ groups each connected to a corresponding one of $N_H \times M_V$ combiner/divider units, each group of phase shifters correspond to $K_V$ channels, and $N_V = M_V K_V$; and one end of each of the $N_H \times M_V$ transceivers is connected to a corresponding one of the $N_H \times M_V$ combiner/divider units, wherein the $N_H \times 1$ digital antenna ports of the $N_H \times M_V$ digital antenna ports are mapped on the basis of a predetermined analog precoding matrix and a predetermined digital precoding matrix at an analog precoding matrix selection stage of an analog precoding period, and the $N_H \times M_V$ digital antenna ports are mapped on the basis of a target analog precoding matrix at a target analog precoding matrix using stage of the analog precoding period, wherein the CSI feedback method comprises steps of:

at the analog precoding matrix selection stage of an analog precoding period, receiving, by a User Equipment (UE), a precoded downlink reference signal from a base station on a subframe corresponding to each of a plurality of time offsets; and feeding first-stage CSI and measurement information back to the base station, the first-stage CSI being CSI calculated in accordance with a measurement result after the UE has measured a spatial channel in accordance with the received, precoded downlink reference signal, and the measurement information being an average value of Reference Signal Received Power (RSRP) values corresponding to the time offsets or an average value of Channel Quality Indicator (CQI) values corresponding to the time offsets; and at the target analog precoding matrix using stage of the analog precoding period, receiving, by the UE, the downlink reference signal precoded by the target analog precoding matrix from the base station on each predetermined subframe and feedback the second-stage CSI to the UE, the second-stage CSI being CSI calculated in accordance with a measurement result after the UE has measured the spatial channel in accordance with the received downlink reference signal precoded by the target analog precoding matrix;

wherein the target analog precoding matrix is one of the analog precoding matrices corresponding to the time offsets having the maximum performance measurement value comprising the CQI value or the RSRP value fed back by the UE.

18. A Channel State Information (CSI) feedback device of a massive digital-analog hybrid antenna, comprising a processor, a second transceiver and a memory, wherein the processor is configured to execute the CSI feedback method according to claim 17, when reading a computer-readable program stored in the memory;

the second transceiver is configured to receive and transmit data; and the memory is configured to store therein data for the operation of the processor.

* * * * *